(12) United States Patent
Chen et al.

(10) Patent No.: US 11,313,829 B2
(45) Date of Patent: Apr. 26, 2022

(54) RAPID BLOTTING DEVICE AND APPLICATIONS THEREOF

(71) Applicant: Nanjing GenScript Biotech Co., Ltd., Nanjing (CN)

(72) Inventors: Xin Chen, Nanjing (CN); Chao Wang, Nanjing (CN)

(73) Assignee: Nanjing GenScript Biotech Co., Ltd., Jiangsu (CN)

( * ) Notice: Subject to any disclaimer, the term of this patent is extended or adjusted under 35 U.S.C. 154(b) by 233 days.

(21) Appl. No.: 16/622,191

(22) PCT Filed: Jun. 13, 2018

(86) PCT No.: PCT/CN2018/091116
§ 371 (c)(1),
(2) Date: Dec. 12, 2019

(87) PCT Pub. No.: WO2018/228447
PCT Pub. Date: Dec. 20, 2018

(65) Prior Publication Data
US 2020/0132623 A1    Apr. 30, 2020

(30) Foreign Application Priority Data
Jun. 13, 2017 (WO) ................ PCT/CN2017/088098

(51) Int. Cl.
*G01N 27/447*    (2006.01)
(52) U.S. Cl.
CPC .............................. *G01N 27/44739* (2013.01)
(58) Field of Classification Search
CPC .............................................. G01N 27/44739
See application file for complete search history.

(56) References Cited

U.S. PATENT DOCUMENTS

| 1,921,876 | A | * | 8/1933 | Grunwald | ............... A24F 19/12 |
| | | | | | 206/120 |
| 2,946,453 | A | * | 7/1960 | Pityo | ........................ B60P 7/10 |
| | | | | | 211/41.14 |

(Continued)

FOREIGN PATENT DOCUMENTS

| CN | 1529812 | 9/2004 |
| CN | 103502808 | 1/2014 |

(Continued)

OTHER PUBLICATIONS

Online Merriam-Webster Dictionary definition of "elastic". Downloaded on Oct. 7, 2021 from https://www.merriam-webster.com/dictionary/elastic (Year: 2021).*

(Continued)

*Primary Examiner* — Alexander S Noguerola
(74) *Attorney, Agent, or Firm* — Klarquist Sparkman, LLP

(57) ABSTRACT

Provided herein is a wet protein blotting system comprising (a) a dry assembly module; (b) a protein blotting chamber; (c) a liquid transfer buffer handling system; and (d) a control panel and power supply. The wet protein blotting systems provided herein reduces the blotting time of a traditional wet blotting process while maintaining the ability for high sensitivity in the transfer of proteins from a polyacrylamide gel to a membrane. Also provided are dry assembly modules and liquid transfer buffer handling systems that enable a fully automatic buffer manipulation system by one or more than one transfer buffers could be pumped into the protein blotting chamber to enhance the transfer efficiency. Also provided is a protein blotting chamber capable of controlling the temperature of the wet protein blotting system.

15 Claims, 3 Drawing Sheets

(56) References Cited

U.S. PATENT DOCUMENTS

| | | | |
|---|---|---|---|
| 5,112,459 A | 5/1992 | Sorge et al. | |
| 2010/0213064 A1* | 8/2010 | Latham | G01N 27/44739 204/456 |
| 2016/0231272 A1* | 8/2016 | McKee | G01N 27/44739 |
| 2016/0377574 A1* | 12/2016 | Jonsson Axelsson | G01N 27/44739 204/614 |

FOREIGN PATENT DOCUMENTS

| | | | |
|---|---|---|---|
| JP | 2004535557 A | 11/2004 | |
| JP | 2012518792 A | 8/2012 | |
| WO | WO 02077630 A1 * | 10/2002 | G01N 27/26 |
| WO | WO 2005/098408 A1 | 10/2005 | |
| WO | WO 2015/078779 A1 | 6/2015 | |

OTHER PUBLICATIONS

Office Action, Chinese Patent Application No. 201880039500.2, 8 pages, dated Nov. 24, 2021 [with English translation].

Notice of Reasons for Refusal, Japanese Patent Application No. 2019-568707, 5 pages, dated Dec. 21, 2021 [with English translation].

* cited by examiner

FIG. 1 (a) gel holder
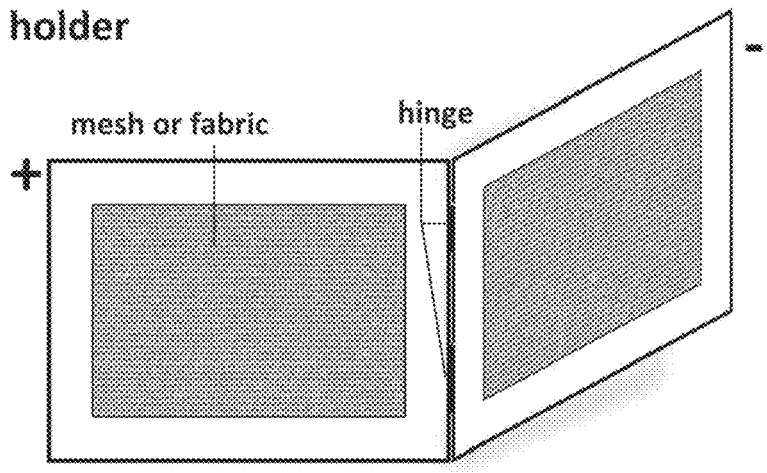
FIG. 1 (b) dry assembly of the "sandwich"
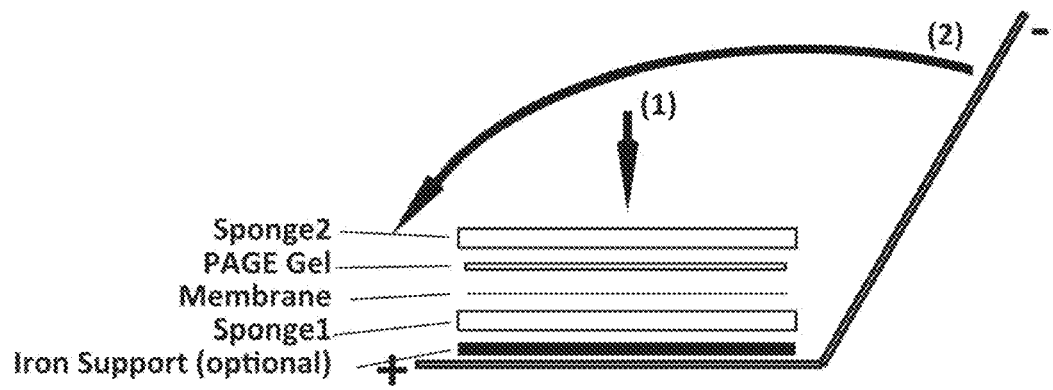
FIG. 1 (c) blotting "sandwich"

RAPID BLOTTING DEVICE AND APPLICATIONS THEREOF

CROSS REFERENCE TO RELATED APPLICATIONS

This is the § 371 U.S. National Stage of International Application No. PCT/CN2018/091116, filed Jun. 13, 2018, which was published in English under PCT Article 21(2), which in turn claims the benefit of PCT Application No. PCT/CN2017/088098, filed Jun. 13, 2017.

FIELD OF THE INVENTION

This invention relates to the field of biotechnology. Specifically, this inventions relates to a device and applications for wet blotting of proteins and nucleic acids.

BACKGROUND OF THE INVENTION

Imprinting or blotting of a bio-macro-molecule is a comprehensive technology that integrates gel electrophoresis separation, immobilization of the target on a membrane and molecular recognition and visualization, the core of which is to transfer the separated bio-macro-molecule from electrophoresed gel onto a stationary paper or membrane.

The first bio-macro-molecule blotting method was developed by Professor Sir Edwin Mellor Southern from the University of Edinburgh, Scotland in the year 1975. High molecular weight DNA strands were cut by endonucleases into small fragments, which were electrophoresed on an agarose gel to separate by size. A cellulose acetate paper was placed onto the agarose gel, and the DNA fragments were transferred onto the paper under capillarity effect, immobilized in the paper, and visualized with hybrid oligonucleotides. To honor Sir Edwin Mellor Southern, this method for DNA analysis is named the Southern-Blot. In addition, the same method for RNA analysis is named the Northern-Blot.

In the year 1979, Harry Towbin from Friedrich Miescher Institute utilized the similar technology for protein antigen detection by applying an electronic field to assist blotting and named it immunoblotting. In 1981, "Western-Blot" was officially introduced by W. Neal Burnette as the method for the detection of proteins.

A traditional protein/western blotting includes the following steps: 1) protein separation with SDS-PAGE electrophoresis; 2) protein transferring to a membrane, usually a NC or PVDF membrane; 3) antibody incubation (primary and/or secondary antibodies); and 4) visualization.

Within this procedure, step 2 is complicated and highly skill-dependent. To assemble a transfer sandwich, the operator typically needs to sequentially place the following things: 1) anode plate; 2) sponge; 3) 3 layers of filter paper; 4) electrophoresed polyacrylamide gel with separated proteins; 5) NC or PFDV transfer membrane; 6) another 3 layers of filter paper; 7) another sponge; and 8) cathode plate.

To ensure tight contacts of each layer, air bubble removal is needed for each step, and all the filter papers or pads involved need to be pre-wetted, which usually caused errors during the membrane-gel assembly. The traditional wet transfer process used plenty of blotting buffers to ensure buffer capacity and to keep the transfer process at a relatively low temperature, which limited the use of high voltage potential. Thus, for a better transfer result, 60 to 90 minutes were often recommended for the traditional wet transfer process.

To shorten the transfer time, the most convenient way was to apply a higher voltage potential. To avoid too much heat generation, the blotting system was adjusted to require less buffer and have a shorter distance between electrodes. Thus, semi-dry or dry blotting systems were invented to complete the blotting in less than 10 minutes. Those new systems shortened the transfer time, but at the same time sacrificed the efficiency of the blotting, especially for higher molecular weight proteins, and, thus, raised a new problem the transfer of high molecule weight proteins and low molecule weight proteins was not even. For example, a protein over 100 KDa could not be transferred efficiently, while a 10 KD protein transferred well, or, alternatively, a protein over 100 KDa transferred sufficiently, while a 10 KDa protein was over transferred and was not able to be detected on the membrane. Additionally, the assembly of membrane and gel was still a complicated operation for a semi-dry or dry blotting system. Overall, semi-dry or dry blotting systems have limited transfer efficiency. Thus, a person of skill in the art was forced back to the traditional wet blotting system for a better blotting result when higher efficiency was needed.

Thus, there is a need in the art for a protein blotting system that has high efficiency and produces a consistent and even transfer of proteins, as provided by a traditional wet transfer protein blotting system, and, further, the protein blotting system has a high protein transfer capacity such that the transfer of the protein from the gel to the membrane is complete within 15 minutes, as provided by the quick semi-dry or dry protein blotting systems.

BRIEF SUMMARY OF THE INVENTION

Provided herein is a novel rapid wet blotting device that combines the merits of traditional wet transfer protein blotting systems and quick semi-dry protein blotting systems.

Provided herein is a wet protein blotting system. The wet protein blotting system can comprise (a) a dry assembly module; (b) a protein blotting chamber; (c) a liquid transfer buffer handling system; and (d) a control panel and power supply.

In certain embodiments, the dry assembly module comprises a structure capable of providing pressure to ensure a tight contact between a polyacrylamide gel and a transfer membrane. The structure can, for example, be selected from a fixing device, a gel holder, or the protein blotting chamber. The structure can, for example, comprise an elastic material. The elastic material can, for example, be selected from the group consisting of stainless steel springs, sponges, filter papers, and silica gel.

In certain embodiments, the structure is a gel holder, and wherein the dry assembly module further comprises (a) a first sponge; (b) a pre-wetted membrane; (c) a polyacrylamide gel comprising at least one protein; and (d) a second sponge, wherein (a)-(d) are assembled in a sequential order in the gel holder. The dry assembly module can further comprise an iron plate, wherein the iron plate is capable of being placed on top of the first frame structure and under the first sponge.

In certain embodiments, the gel holder comprises a first frame structure comprising a cathode and a second frame structure comprising an anode. The first frame structure and the second frame structure can be connected by a hinge. The first frame structure comprising a cathode and the second frame structure comprising an anode can further comprise an elastic material. The elastic material can, for example, be selected from the group consisting of iron mesh, fabric, stainless steel springs, sponges, filter papers, and silica gel. The gel holder can, for example, further comprise a conductive plate. The conductive plate can, for example, be an iron plate. The gel holder can, for example, further comprise a silica gel layer between the elastic material of the first frame structure and the elastic material of the second frame structure.

In certain embodiments, the structure can be configured to provide an electronic field or force to the dry assembly module for the transfer of proteins from a polyacrylamide gel to a transfer membrane. The structure can, for example, comprise a device or part that is capable of conducting electricity, which can provide the electronic field or force to the dry assembly module. The device or part can, for example, be made from a metal selected from, but is not limited to, the group consisting of titanium (Ti), platinum (Pt), gold (Au), palladium (Pd), tantalum (Ta), a titanium alloy, a platinum alloy, a gold alloy, a palladium alloy, and a tantalum alloy. The device or part can, for example, be a soft, porous net or a solid imporous plate.

In certain embodiments, the protein blotting chamber comprises a conductive inner surface, wherein the conductive inner surface is capable of providing an electronic field or force for the transfer of proteins from a polyacrylamide gel to a transfer membrane. The conductive inner surface can, for example be made from a metal selected from, but is not limited to, the group consisting of titanium (Ti), platinum (Pt), gold (Au), palladium (Pd), tantalum (Ta), a titanium alloy, a platinum alloy, a gold alloy, a palladium alloy, and a tantalum alloy.

In certain embodiments, the dry assembly module is placed within the protein blotting chamber. The protein blotting chamber can, for example, comprise at least one inlet tube that is connected to the liquid transfer buffer handling system and at least one outlet tube that is connected to the liquid transfer buffer handling system or a waste container.

In certain embodiments, the liquid transfer buffer handling system is capable of replacing or replenishing the transfer buffer in the protein blotting chamber. The liquid transfer buffer handling system can, for example, comprise at least one pump, wherein the at least one pump is capable of pumping the transfer buffer in either a single or a bi-directional manner. The liquid transfer buffer handling system can, for example, comprise at least one tube that is connected to a transfer buffer container and at least one tube connected to the protein blotting chamber. In certain embodiments, the liquid transfer buffer handling system is capable of providing two or more transfer buffers of varying composition to the protein blotting chamber. The liquid transfer buffer handling system can, for example, comprise two or more tubes that are connected to two or more transfer buffer containers. The liquid transfer buffer handling device can, for example, be capable of detecting a loss of transfer buffer capacity in the transfer buffer in the protein blotting chamber. Upon detecting the loss of transfer buffer capacity, the liquid transfer buffer handling device can replace or replenish the transfer buffer. The transfer buffer with a loss of transfer buffer capacity can be replaced or replenished with a transfer buffer comprising the same or different composition.

In certain embodiments, the protein blotting chamber comprises a temperature controlling structure. The temperature controlling structure can, for example, comprise at least one heat radiator connected to the protein blotting chamber. In certain embodiments, the at least one heat radiator is attached to an outer surface of the protein blotting chamber.

In certain embodiments, the at least one heat radiator is attached to an inside surface of the protein blotting chamber. The at least one heat radiator can, for example, be selected from at least one fin or at least one hollow tube. The at least one fin or hollow tube can, for example, comprise a metal selected from the group consisting of aluminum, copper, an aluminum alloy, and a copper alloy. The temperature controlling structure can, for example, be selected from a water-cycling based system, an electronic Palti cooling/heating system, or a refrigerating compressor. The protein blotting chamber can, for example, comprise a temperature sensor to detect the temperature in the transfer buffer.

Also provided is a dry assembly module. The dry assembly module can, for example, comprise a structure capable of providing pressure to ensure a tight contact between a polyacrylamide gel and a transfer membrane. The structure can, for example, be selected from a fixing device, a gel holder, or the protein blotting chamber. The structure can, for example, comprise an elastic material. The elastic material can, for example, be selected from the group consisting of stainless steel springs, sponges, filter papers, and silica gel.

In certain embodiments, the structure is a gel holder, and wherein the dry assembly module further comprises (a) a first sponge; (b) a pre-wetted membrane; (c) a polyacrylamide gel comprising at least one protein; and (d) a second sponge, wherein (a)-(d) are assembled in a sequential order in the gel holder. The dry assembly module can further comprise a conductive plate, wherein the conductive plate is capable of being placed on top of the first frame structure and under the first sponge. The conductive plate can, for example, be an iron plate.

In certain embodiments, the gel holder comprises a first frame structure comprising a cathode and a second frame structure comprising an anode. The first frame structure and the second frame structure can be connected by a hinge. The first frame structure comprising a cathode and the second frame structure comprising an anode can further comprise the elastic material. The elastic material can, for example, be selected from the group consisting of iron mesh, fabric, stainless steel springs, sponges, filter papers, and silica gel. The gel holder can, for example, further comprise a conductive plate. The conductive plate can, for example, be an iron plate. The gel holder can, for example, further comprise a silica gel layer between the elastic material of the first frame structure and the elastic material of the second frame structure.

Also provided is a liquid transfer buffer handling system. The liquid transfer buffer handling system can, for example, be capable of replacing or replenishing the transfer buffer in the protein blotting chamber. The liquid transfer buffer handling system can, for example, comprise at least one pump, wherein the at least one pump is capable of pumping the transfer buffer in either a single or a bi-directional manner. The liquid transfer buffer handling system can, for example, comprise at least one tube that is connected to a transfer buffer container and at least one tube connected to the protein blotting chamber. In certain embodiments, the liquid transfer buffer handling system is capable of providing two or more transfer buffers of varying composition to the protein blotting chamber. The liquid transfer buffer handling system can, for example, comprise two or more tubes that are connected to two or more transfer buffer containers. The liquid transfer buffer handling device can, for example, be capable of detecting a loss of transfer buffer capacity in the transfer buffer in the protein blotting chamber. Upon detecting the loss of transfer buffer capacity, the liquid transfer buffer handling device can replace or replenish the transfer buffer. The transfer buffer with a loss of transfer buffer capacity can be replaced or replenished with a transfer buffer comprising the same or different composition.

Also provided is a protein blotting chamber comprising a temperature controlling structure. The temperature controlling structure can, for example, comprise at least one heat radiator connected to the protein blotting chamber. In certain embodiments, the at least one heat radiator is attached to an outer surface of the protein blotting chamber. In certain embodiments, the at least one heat radiator is attached to an inner surface of the protein blotting chamber. The at least one heat radiator can, for example, be selected from at least one fin or at least one hollow tube. The at least one fin or hollow tube can, for example, comprise a metal selected from the group consisting of aluminum, copper, an aluminum alloy, and a copper alloy. The temperature controlling structure can, for example, be selected from a water-cycling based system, an electronic Palti cooling/heating system, or a refrigerating compressor. The protein blotting chamber can, for example, comprise a temperature sensor to detect the temperature in the transfer buffer.

Also provided are methods for replacing or replenishing the transfer buffer in a protein blotting chamber. The methods comprise (a) providing a wet protein blotting system as provided herein; (b) detecting a loss of transfer buffer capacity; (c) utilizing the liquid transfer buffer handling system to replace or replenish the transfer buffer in the protein blotting chamber. The liquid transfer buffer handling system can, for example, detect the loss of transfer buffer capacity, and in response to the loss of transfer buffer capacity, the liquid transfer buffer handling system can pump the used transfer buffer out of the protein blotting chamber and into a waste container, and can concurrently pump in new transfer buffer into the protein blotting chamber. The liquid transfer buffer handling system can provide one, two, or more than two new transfer buffers of varying compositions to the protein blotting chamber.

Also provided are methods for performing a dry assembly in a dry assembly module as provided herein. The methods comprise (a) providing a gel holder comprising a first frame structure and a second frame structure connected by a hinge; (b) placing a first sponge on the first frame structure of the gel holder; (c) placing a pre-assembled, pre-wetted membrane and polyacrylamide gel complex on top of the first sponge, wherein the pre-wetted membrane is in contact with the first sponge; (d) placing a second sponge on top of the polyacrylamide gel; and (e) folding the second frame structure onto the first frame structure to form a dry assembly module. The gel holder and the first and second sponge can, for example, remain dry during the dry assembly process. In certain embodiments, the first frame structure comprises a cathode and the second frame structure comprises an anode. The first frame structure comprising the cathode and the second frame structure comprising the anode can further comprise an elastic material. The elastic material can, for example, be selected from the group consisting of iron mesh, fabric, stainless steel springs, sponges, filter papers, and silica gel. The gel holder can, for example, further comprise a conductive plate. The conductive plate can, for example, be an iron plate. The gel holder can, for example, further comprise a silica gel layer between the elastic material of the first frame structure and the elastic material of the second frame structure. In certain embodiments, the dry assembly module can further comprise a separate conductive plate, wherein the conductive plate is capable of being placed on top of the first frame structure and under the first sponge. The conductive plate can, for example, be an iron plate.

Also provided are methods for passive heat dissipation when utilizing a wet protein blotting system as described herein. The methods comprise (a) providing a wet protein blotting system as described herein, wherein the wet protein blotting system comprises a protein blotting chamber; (b) passing a current through the protein blotting chamber, wherein passing the current through the protein blotting chamber produces heat in the protein blotting chamber; and (c) equipping the protein blotting chamber with at least one heat radiator capable of dissipating the heat produced by the current. In certain embodiments, the at least one heat radiator is attached to an outer surface of the protein blotting chamber. In certain embodiments, the at least one heat radiator is attached to an inner surface of the protein blotting chamber. The at least one heat radiator can, for example, be selected from at least one fin or at least one hollow tube. The at least one fin or hollow tube can, for example, comprise a metal selected from the group consisting of aluminum, copper, an aluminum alloy, and a copper alloy.

BRIEF DESCRIPTION OF THE DRAWINGS

The foregoing summary, as well as the following detailed description of preferred embodiments of the present application, will be better understood when read in conjunction with the appended drawings. It should be understood, however, that the application is not limited to the precise embodiments shown in the drawings.

FIGS. 1a-c show a schematic of the blotting sandwich assembly. FIG. 1a shows a schematic of the specially designed blotting holder. FIG. 1b shows a schematic of the sequential assembly of the blotting sandwich: blotting holder; iron support (optional); sponge 1; membrane; SDS-PAGE gel; sponge 2. FIG. 1c shows a schematic of the blotting sandwich.

DETAILED DESCRIPTION OF THE INVENTION

Figure 2:
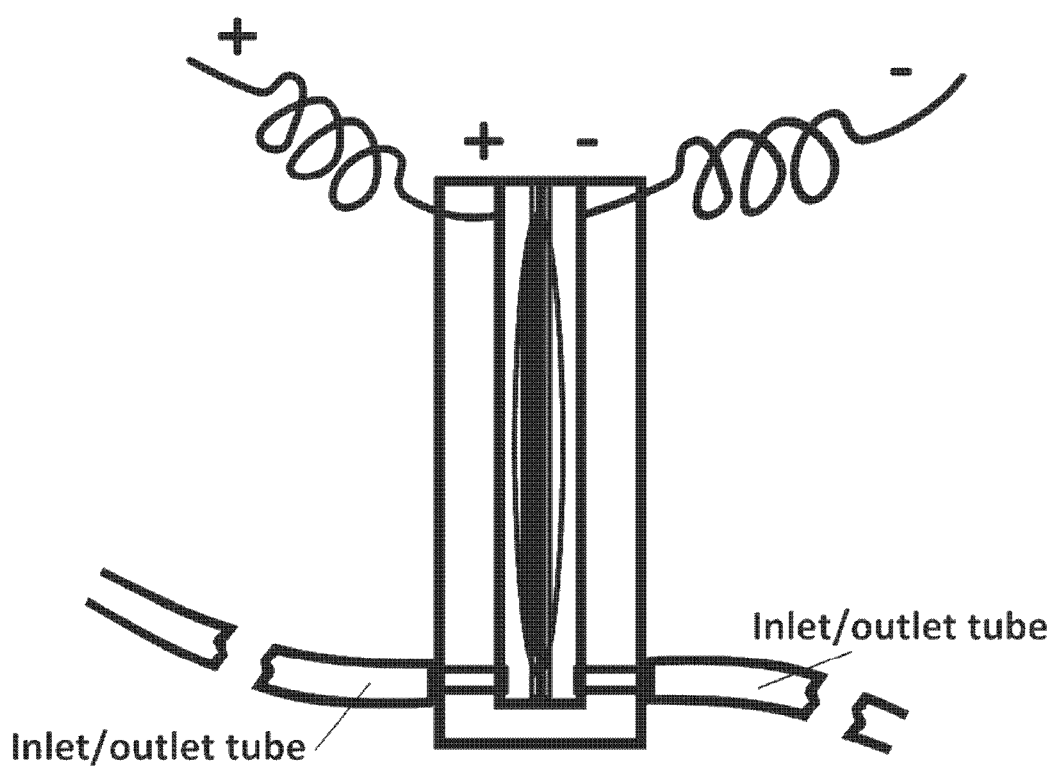
FIG. 2 shows a schematic of the blotting sandwich inserted in the blotting chamber.

This disclosure is based upon, at least in part, on the creation of a novel rapid wet protein blotting device/system that greatly shortens the blotting time of a traditional wet blotting process while still remaining highly efficient in transferring proteins. The wet protein blotting device/system utilizes a new dry assembly module that simplifies and streamlines assembly of the protein gel sandwich for the transfer of proteins from the polyacrylamide gel to the transfer membrane. The wet protein blotting device/system further utilizes a liquid transfer buffer handling module that enables fully automatic buffer manipulation by which multiple changes (or additions) of the transfer buffer can be applied to enhance the transfer efficiency of the proteins from the polyacrylamide gel to the transfer membrane. The wet protein blotting device further utilizes a specially designed protein blotting chamber, which is used for efficient transfer as well as temperature control. The wet protein blotting device is robust and easy to use which greatly improves the wet blotting procedure.

Various publications, articles and patents are cited or described in the background and throughout the specification; each of these references is herein incorporated by reference in its entirety. Discussion of documents, acts, materials, devices, articles or the like which has been included in the present specification is for the purpose of providing context for the invention. Such discussion is not an admission that any or all of these matters form part of the prior art with respect to any inventions disclosed or claimed.

Unless defined otherwise, all technical and scientific terms used herein have the same meaning as commonly understood to one of ordinary skill in the art to which this invention pertains. Otherwise, certain terms used herein have the meanings as set forth in the specification.

It must be noted that as used herein and in the appended claims, the singular forms "a," "an," and "the" include plural reference unless the context clearly dictates otherwise.

Unless otherwise stated, any numerical values, such as a concentration or a concentration range described herein, are to be understood as being modified in all instances by the term "about."

Thus, a numerical value typically includes ±10% of the recited value. For example, a concentration of 1 mg/mL includes 0.9 mg/mL to 1.1 mg/mL. Likewise, a concentration range of 1% to 10% (w/v) includes 0.9% (w/v) to 11% (w/v). As used herein, the use of a numerical range expressly includes all possible subranges, all individual numerical values within that range, including integers within such ranges and fractions of the values unless the context clearly indicates otherwise.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the invention.

As used herein, the terms "comprises," "comprising," "includes," "including," "has," "having," "contains" or "containing," or any other variation thereof, will be understood to imply the inclusion of a stated integer or group of integers but not the exclusion of any other integer or group of integers and are intended to be non-exclusive or open-ended. For example, a composition, a mixture, a process, a method, an article, or an apparatus that comprises a list of elements is not necessarily limited to only those elements but can include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the conjunctive term "and/or" between multiple recited elements is understood as encompassing both individual and combined options. For instance, where two elements are conjoined by "and/or", a first option refers to the applicability of the first element without the second. A second option refers to the applicability of the second element without the first. A third option refers to the applicability of the first and second elements together. Any one of these options is understood to fall within the meaning, and therefore satisfy the requirement of the term "and/or" as used herein. Concurrent applicability of more than one of the options is also understood to fall within the meaning, and therefore satisfy the requirement of the term "and/or."

As used herein, the term "consists of," or variations such as "consist of" or "consisting of," as used throughout the specification and claims, indicate the inclusion of any recited integer or group of integers, but that no additional integer or group of integers can be added to the specified method, structure, or composition.

As used herein, the term "consists essentially of," or variations such as "consist essentially of" or "consisting essentially of," as used throughout the specification and claims, indicate the inclusion of any recited integer or group of integers, and the optional inclusion of any recited integer or group of integers that do not materially change the basic or novel properties of the specified method, structure or composition. See M.P.E.P. § 2111.03.

The words "right", "left", "lower" and "upper" designate directions in the drawings to which reference is made.

It should also be understood that the terms "about," "approximately," "generally," "substantially" and like terms, used herein when referring to a dimension or characteristic of a component of the preferred invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Assembly of the Dry Assembly Module (i.e., the Protein Blotting Sandwich)

For the assembly of the dry assembly module, the rapid wet protein blotting system can use a new hydrophilic porous sponge instead of the traditional sponges or filter paper that is typically used. The excellent elasticity of the sponges can provide sufficient pressure between the polyacrylamide gel and the transfer membrane. Additionally, the efficient hygroscopicity of the sponge can enable a new dry-assembly method for sandwich assembly without the need for pre-wetting the sponges.

To assist the dry assembly module, a new holder was created. The holder can have a first frame structure comprising a cathode and a second frame structure comprising an anode linked with hinges, each node can have an iron mesh or fabric in the middle to provide extra flexibility and elasticity. The two nodes can be separated with a silica gel frame, which can be designed to avoid short-circuit and improve current-flow. An iron plate or support can be used to support the dry assembly module structure. Generally, after electrophoresis of a polyacrylamide gel, the gel holder can be placed like shown in FIGS. 1a-c with the frame structure comprising the cathode down. An iron plate or support can be placed onto the cathode (this part is optional as the iron plate or support could increase the consistency of the blotting). A first sponge can be placed on top of the iron plate or support or directly on the cathode if an iron plate or support is not used. A pre-wetted membrane and the polyacrylamide gel can be placed on top of the first sponge. The pre-wetted membrane and polyacrylamide gel can be assembled together prior to placing on the first sponge. Alternatively, the pre-wetted membrane and polyacrylamide gel can be sequentially added on top of the first sponge. A second sponge can be placed sequentially on top of the polyacrylamide gel to assemble the dry assembly module. After that, the frame structure comprising the anode of the gel holder can be pushed down to close the gel holder. The dry assembly module can be subsequently inserted into the protein blotting chamber for the transfer of the proteins to the membrane (i.e., the "blotting" or the "transfer").

The only pre-wetting step needed can be for the membrane, which can be done to increase the sensitivity of the western blotting. The pre-wetting buffer can contain alcohol for the proteins transferred from the polyacrylamide gel and retained on the membrane. The only bubble-scraping step needed can be for placing the PAGE gel onto the pre-wetted membrane.

Applying Voltage to the Protein Blotting Chamber

Once the dry assembly module has been assembled and placed into the protein blotting chamber accordingly with the electronic nodes (FIG. 2), the transfer buffer can be pumped into the chamber under the control of the liquid transfer buffer handling system. Then the voltage can be applied to start the transfer of proteins from the polyacrylamide gel to the membrane.

The specially designed protein blotting chamber can use about 100 mL of transfer buffer solution for each cycle of transfer. The electronic nodes can be wired directly to the two nodes of dry assembly module comprising the protein blotting sandwich structure.

As the voltage is applied directly on the cathode and anode of the dry assembly module, the transfer efficiency can be much higher than the traditional wet transfer. So a relatively lower voltage can be utilized for the transfer, such as 24V or 16V. With the optimized buffer and suitable voltage potential, the proteins (protein complex) in a polyacrylamide gel can be transferred from the gel to the membrane.

Programmable Blotting Procedures and Blotting Improvement

Once the voltage has been applied, proteins (protein complex) can be transferred onto the membrane. At the same time, the ions in the transfer buffer solution can be depleted under the electronic driving force.

In a traditional western blotting experiment, a large volume of transfer buffer solution can be used to maintain the buffer capacity, while in a semi-dry or dry blotting experiment, the problem of maintaining transfer buffer capacity can occur, so the transfer results can be compromised to save time.

Figure 3:
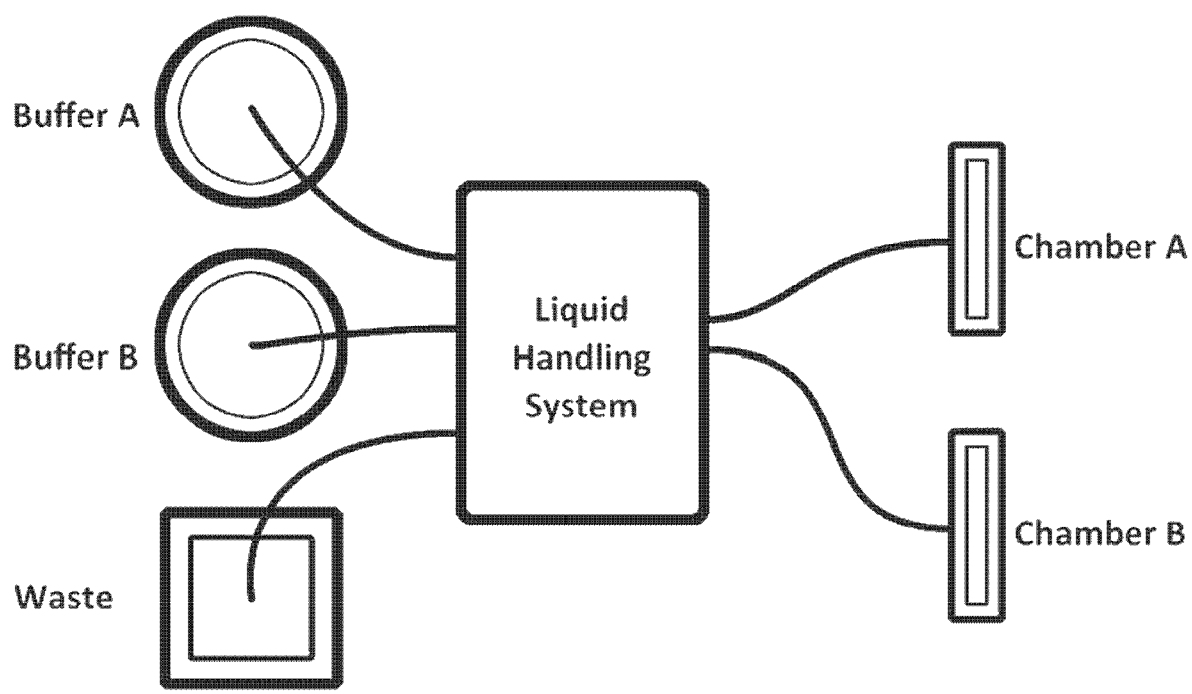
FIG. 3 shows a schematic of the automatic liquid handling system.

In the instant system, an automatic liquid transfer buffer handling system (FIG. 3) can be introduced to manipulate the transfer buffer solution. The system can use one or more different transfer buffer solutions to improve the transfer efficiency. If only one transfer buffer solution is applied, the system can reset the buffer capacity by draining out old solution into a waste container and pumping in fresh solution or replenishing the protein blotting chamber with new solution.

By way of an example, for small protein transfer to the membrane, the transfer buffer solution can comprise 10 mM tris base, 50 mM glycine, at a pH of 7.0. For larger protein transfer to the membrane, the transfer buffer solution can comprise 50 mM tris base, 10 mM glycine, 0.01% to 0.1% SDS at a pH of 8.0. By way of another example, for small protein transfer, the transfer buffer can comprise 0-5% methanol, 10 mM tris base, and 10 mM glycine. By way of another example, for larger protein transfer, the transfer buffer can comprise 20% methanol, 10 mM tris base, and 10 mM glycine.

In an optimized experiment, 3 cycles of blotting can be executed sequentially with 3 to 5 minutes for each cycle. All the steps can be pre-programmed in the liquid transfer buffer handling system and all the parameters can be manipulated for each different blotting application.

The blotting results can be optimized by changing the blotting program. For example, if the target protein or complex is larger than 150 KD, the blotting time can be prolonged or an extra blotting cycle can be added for a better transfer efficiency.

Figure 4:
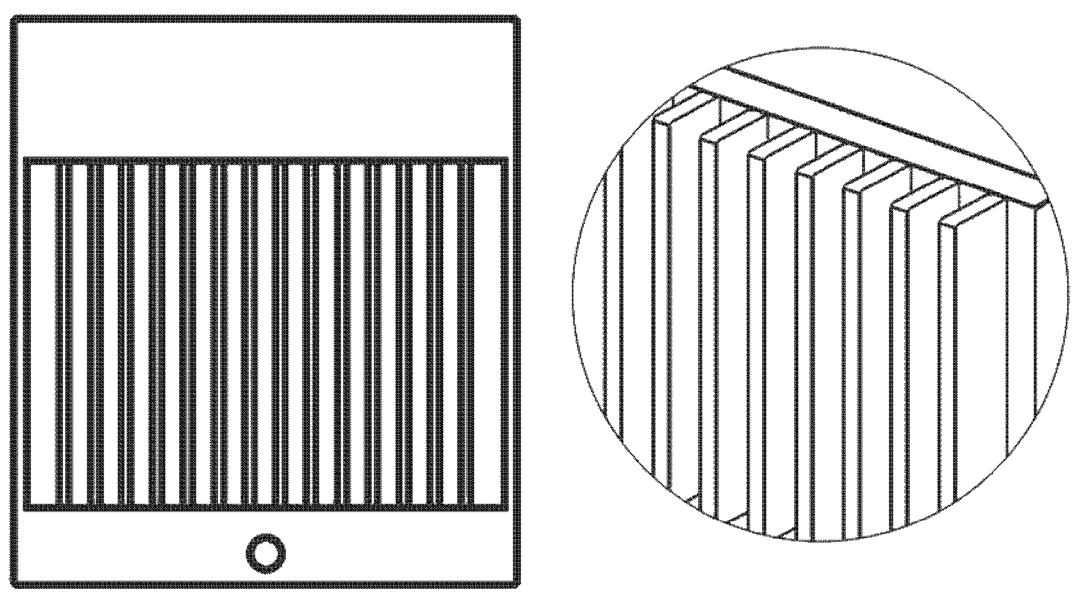
FIG. 4 shows a schematic of the blotting chamber equipped with a fin-structure heat dissipater.

The blotting efficiency can also be affected by the heat which can be generated while the voltage is applied. The accumulated heat can decrease the blotting efficiency. One reason the accumulated heat can decrease the blotting efficiency is that the heat can produce tiny bubbles between the membrane and the polyacrylamide gel, which can create a barrier to prevent an efficient transfer of proteins from the gel to the membrane. A second reason is that the heat can result in an over-transfer of proteins which are supposed to be retained in the membrane, and, thus, the proteins are passed through the membrane. To avoid over-heat of the gel holder, a fin shaped heat radiator was designed and equipped at the sides of the blotting chamber (FIG. 4).

Replacing or Replenishing of the Buffers

Another problem of semi-dry blotting can occur when you need to transfer more than one target protein at the same time. The transfer efficiency for easier to transfer (e.g. smaller proteins) and harder to transfer (e.g. large proteins) may not allow even transfer results, as the transfer efficiency may be adequate for easy to transfer proteins but not for harder to transfer proteins.

To solve this problem, a two-buffer blotting/transfer method was developed. The first transfer buffer can allow for a delay in the transfer of easier to transfer (i.e., smaller) proteins by adding a defined amount of reagent, such as CAPS (N-cyclohexyl-3-aminopropanesulfonic acid (CAS 1135-40-6). The reagent would typically be between 1 mM to 50 mM, usually around 10 mM, and the type of reagent would typically be a reagent with a high pKa, which would be positively charged in a pH 8.0 buffer solution. While in the first transfer buffer, the transfer efficiency of harder to transfer (i.e., larger) proteins can be less affected or not affected at all. After a defined period of time for transfer, the first transfer buffer can be removed, and the protein blotting chamber can be flushed with a second transfer buffer, which can restore the transfer efficiency of small proteins. The faster transfer of easier to transfer (i.e., smaller) proteins in the second buffer can allow for the same level of transfer as the harder to transfer (i.e., larger) proteins, which can result in an even transfer of smaller and larger proteins.

Alternatively, the first transfer buffer can allow for the unaffected transfer of easier to transfer (i.e., smaller) proteins and harder to transfer (i.e., larger) proteins for a defined period of time. As the easier to transfer proteins can migrate quickly onto the membrane, a large portion of harder to transfer proteins can remain in the gel. After the defined period of time, a second transfer buffer can be introduced. The second buffer can delay or stop the migration of the easier to transfer proteins to the membrane. The migration of harder to transfer proteins from the gel to the membrane is not affected in the second buffer, and, thus, the harder to transfer proteins can be transferred normally onto the membrane. The second buffer can usually contain a higher concentration of alcohols such as methanol, ethanol or ethanediol, and/or other chemicals (e.g., organic reagents that contain multiple hydroxyl groups). At higher concentrations of alcohols and/or other chemicals, the migration of easier to transfer proteins from gels to membranes can also be slowed down.

With the multi-buffer blotting system, the blotting/transfer process of easier to transfer and harder to transfer proteins can be controlled intentionally, by which even blotting results of both proteins can be obtained.

Buffer Optimization

For better blotting efficiency, numerous experiments were done to optimize the transfer solution. Various solvents were tested for increased safety as well as efficiency. For example some of the formulations tested included the substitution of methanol with other alcohols such as ethanol, isopropanol, ethanediol for safety issues as well as better blotting/transfer results. Various buffer ions were tested, for example CAPS was used for trapping small fragments on the membrane and SDS was used for assistance for the transfer of larger proteins. Also, different pH from 9 to 11.5 were tested. All the results were compared with the traditional wet transfer and semi-dry blotting (iblot and Turbo).

EMBODIMENTS

The invention provides also the following non-limiting embodiments.

Embodiment 1 is a wet protein blotting system, wherein the wet protein blotting system comprises: (a) a dry assembly module; (b) a protein blotting chamber; (c) a liquid transfer buffer handling system; and (d) a control panel and power supply.

Embodiment 2 is the wet protein blotting system of embodiment 1, wherein the dry assembly module comprises a structure capable of providing pressure.

Embodiment 3 is the wet protein blotting system of embodiment 2, wherein the structure is selected from a fixing device, a gel holder, or the protein blotting chamber.

Embodiment 4 is the wet protein blotting system of embodiment 2 or 3, wherein the structure comprises an elastic material.

Embodiment 5 is the wet protein blotting system of embodiment 4, wherein the elastic material is selected from the group consisting of stainless steel springs, sponges, filter papers, and silica gel.

Embodiment 6 is the wet protein blotting system of any one of embodiments 1-5, wherein the structure is a gel holder, and wherein the dry assembly module further comprises (a) a first sponge; (b) a pre-wetted membrane; (c) a polyacrylamide gel comprising at least one protein; and (d) a second sponge, wherein (a)-(d) are assembled in a sequential order in the gel holder.

Embodiment 7 is the wet protein blotting system of embodiment 6, wherein the gel holder comprises a first frame structure comprising a cathode and a second frame structure comprising an anode, wherein the first frame structure and the second frame structure are connected by a hinge.

Embodiment 8 is the wet protein blotting system of embodiment 7, wherein the first frame structure comprising a cathode and the second frame structure comprising an anode further comprise the elastic material.

Embodiment 9 is the wet protein blotting system of embodiment 8, wherein the elastic material is selected from the group consisting of iron mesh, fabric, stainless steel springs, sponges, filter papers, and silica gel.

Embodiment 10 is the wet protein blotting system of any one of embodiments 6-9, wherein the dry assembly module further comprises an iron plate, wherein the iron plate is capable of being placed on top of the first frame structure and under the first sponge.

Embodiment 11 is the wet protein blotting system of any one of embodiments 1-10, wherein the dry assembly module is placed within the protein blotting chamber.

Embodiment 12 is the wet protein blotting system of any one of embodiments 1-11, wherein the protein blotting chamber comprises at least one inlet tube that is connected to the liquid transfer buffer handling system and at least one outlet tube that is connected to the liquid transfer buffer handling system or a waste container.

Embodiment 13 is the wet protein blotting system of any one of embodiments 1-12, wherein the liquid transfer buffer handling system is capable of replacing or replenishing the transfer buffer in the protein blotting chamber.

Embodiment 14 is the wet protein blotting system of embodiment 13, wherein the liquid transfer buffer handling system comprises at least one pump, wherein the at least one pump is capable of pumping the transfer buffer in either a single or a bi-directional manner.

Embodiment 15 is the wet protein blotting system of embodiment 13 or 14, wherein the liquid transfer buffer handling system comprises at least one tube that is connected to a transfer buffer container and at least one tube connected to the protein blotting chamber.

Embodiment 16 is the wet protein blotting system of any one of embodiments 13-15, wherein the liquid transfer buffer handling system is capable of providing two or more transfer buffers of varying composition to the protein blotting chamber.

Embodiment 17 is the wet protein blotting system of embodiment 16, wherein the liquid transfer buffer handling system comprises two or more tubes that are connected to two or more transfer buffer containers.

Embodiment 18 is the wet protein blotting system of any one of embodiments 13-17, wherein the liquid transfer buffer handling device is capable of detecting a loss of transfer buffer capacity in the transfer buffer in the protein blotting chamber, wherein upon detecting the loss of transfer buffer capacity, the liquid transfer buffer handling device replaces or replenishes the transfer buffer.

Embodiment 19 is the wet protein blotting system of embodiment 18, wherein the transfer buffer with a loss of transfer buffer capacity is replaced or replenished with a transfer buffer comprising the same composition.

Embodiment 20 is the wet protein blotting system of embodiment 18, wherein the transfer buffer with a loss of transfer buffer capacity is replaced or replenished with a transfer buffer comprising a different composition.

Embodiment 21 is the wet protein blotting system of any one of embodiments 1-20, wherein the protein blotting chamber comprises a temperature controlling structure.

Embodiment 22 is the wet protein blotting system of embodiment 21, wherein the temperature controlling structure comprises at least one heat radiator connected to the protein blotting chamber.

Embodiment 23 is the wet protein blotting system of embodiment 22, wherein the at least one heat radiator is at least one fin or hollow tube.

Embodiment 24 is the wet protein blotting system of embodiment 23, wherein the at least one fin or hollow tube comprises a metal selected from the group consisting of aluminum, copper, an aluminum alloy, and a copper alloy.

Embodiment 25 is the wet protein blotting system of embodiment 21, wherein the temperature controlling structure is selected from a water-cycling based system, an electronic Palti cooling/heating system, or a refrigerating compressor.

Embodiment 26 is the wet protein blotting system of any one of embodiments 21-25, wherein the protein blotting chamber comprises a temperature sensor to detect the temperature in the transfer buffer.

Embodiment 27 is a method for replacing or replenishing the transfer buffer in a protein blotting chamber, the method comprising (a) providing a wet protein blotting system of embodiments 1-26; (b) detecting a loss of transfer buffer capacity; (c) utilizing the liquid transfer buffer handling system to replace or replenish the transfer buffer in the protein blotting chamber.

Embodiment 28 is the method of embodiment 27, wherein the liquid transfer buffer handling system is capable of detecting the loss of transfer buffer capacity, and in response to the loss of transfer buffer capacity, the liquid transfer buffer handling system is capable of pumping the used transfer buffer out of the protein blotting chamber and into a waste container, and concurrently is capable of pumping new transfer buffer into the protein blotting chamber.

Embodiment 29 is the method of embodiment 28, wherein the liquid transfer buffer handling system provides one, two, or more than two new transfer buffers of varying compositions to the protein blotting chamber.

Embodiment 30 is a method for performing a dry assembly in a dry assembly module, wherein the method comprises (a) providing a gel holder comprising a first frame structure and a second frame structure connected by a hinge; (b) placing a first sponge on the first frame structure of the gel holder; (c) placing a pre-assembled, pre-wetted membrane and polyacrylamide gel complex on top of the first sponge, wherein the pre-wetted membrane is in contact with the first sponge; (d) placing a second sponge on top of the polyacrylamide gel; and (e) folding the second frame structure onto the first frame structure to form a dry assembly module.

Embodiment 31 is the method of embodiment 30, wherein the gel holder and the first and second sponge remain dry during the dry assembly process.

Embodiment 32 is the method of embodiment 30 or 31, wherein the first frame structure comprises a cathode and the second frame structure comprises an anode.

Embodiment 33 is the method of embodiment 32, wherein the first frame structure comprising the cathode and the second frame structure comprising the anode further comprise the elastic material.

Embodiment 34 is the method of embodiment 33, wherein the elastic material is selected from the group consisting of iron mesh, fabric, stainless steel springs, sponges, filter papers, and silica gel.

Embodiment 35 is the method of embodiments 30-34, wherein the gel holder further comprises a conductive plate.

Embodiment 36 is the method of embodiment 35, wherein the conductive plate is an iron plate.

Embodiment 37 is the method of embodiment 33, wherein the gel holder further comprises a silica gel layer between the elastic material of the first frame structure and the elastic material of the second frame structure.

Embodiment 38 is a method for passive heat dissipation when utilizing a wet protein blotting system, wherein the method comprises (a) providing a wet protein blotting system of embodiments 1-26, wherein the wet protein blotting system comprises a protein blotting chamber; (b) passing a current through the protein blotting chamber, wherein passing the current through the protein blotting chamber produces heat in the protein blotting chamber; and (c) equipping the protein blotting chamber with at least one heat radiator capable of dissipating the heat produced by the current.

Embodiment 39 is the method of embodiment 38, wherein the at least one heat radiator is attached to an outer surface of the protein blotting chamber.

Embodiment 40 is the method of embodiment 38, wherein the at least one heat radiator is attached to an inner surface of the protein blotting chamber.

Embodiment 41 is the method of embodiment 39 or 40, wherein the at least one heat radiator is selected from at least one fin or at least one hollow tube.

Embodiment 42 is the method of embodiment 41, wherein the at least one fin or hollow tube comprises a metal selected from the group consisting of aluminum, copper, an aluminum alloy, and a copper alloy.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the present description.

It is claimed:

1. A wet protein blotting system, wherein the wet protein blotting system comprises:
   a. an assembly module comprising a pre-wetted gel, a pre-wetted membrane, and a dry sponge;
   b. a protein blotting chamber;
   c. a liquid transfer buffer handling system; and
   d. a control panel and power supply,
   wherein the assembly module is located within the protein blotting chamber.

2. The wet protein blotting system of claim 1, wherein the assembly module further comprises a structure capable of providing pressure.

3. The wet protein blotting system of claim 2, wherein the structure comprises an elastic material.

4. The wet protein blotting system of claim 1, wherein the protein blotting chamber comprises at least one inlet tube that is connected to the liquid transfer buffer handling system and at least one outlet tube that is connected to the liquid transfer buffer handling system or a waste container, wherein the liquid transfer buffer handling system is capable of replacing or replenishing the transfer buffer in the protein blotting chamber.

5. The wet protein blotting system of claim 4, wherein the liquid transfer buffer handling system comprises at least one tube that is connected to a transfer buffer container and at least one tube connected to the protein blotting chamber.

6. The wet protein blotting system of claim 4, wherein the liquid transfer buffer handling system is capable of providing two or more transfer buffers of varying composition to the protein blotting chamber wherein the liquid transfer buffer handling system comprises two or more tubes that are connected to two or more transfer buffer containers.

7. The wet protein blotting system of claim 4, wherein the liquid transfer buffer handling system is capable of detecting a loss of transfer buffer capacity in the transfer buffer in the protein blotting chamber, wherein upon detecting the loss of transfer buffer capacity, the liquid transfer buffer handling system replaces or replenishes the transfer buffer.

8. The wet protein blotting system of claim 4, wherein the liquid transfer buffer handling system comprises at least one pump, wherein the at least one pump is capable of pumping the transfer buffer in either a single or a bi-directional manner.

9. The wet protein blotting system of claim 1, wherein the protein blotting chamber comprises a temperature controlling structure.

10. The wet protein blotting system of claim 9, wherein the temperature controlling structure comprises at least one heat radiator connected to the protein blotting chamber.

11. The wet protein blotting system of claim 9, wherein the temperature controlling structure is selected from a water-cycling based system, an electronic Peltier cooling/heating system, or a refrigerating compressor.

12. The wet protein blotting system of claim 9, wherein the protein blotting chamber comprises a temperature sensor to detect the temperature in the transfer buffer.

13. A wet protein blotting system, wherein the wet protein blotting system comprises:
 a. an assembly module comprising a pre-wetted gel, a pre-wetted membrane, a dry sponge, and a structure capable of providing pressure;
 b. a protein blotting chamber;
 c. a liquid transfer buffer handling system; and
 d. a control panel and power supply,
 wherein the structure comprises an elastic material and the elastic material is selected from the group consisting of stainless steel springs, sponges, filter papers, and silica gel.

14. A wet protein blotting system, wherein the wet protein blotting system comprises:
 a. an assembly module comprising a gel holder capable of providing pressure, the assembly module further comprising:
  i. a first sponge;
  ii. a pre-wetted membrane;
  iii. a polyacrylamide gel comprising at least one protein; and
  iv. a second sponge,
  wherein (i)-(iv) are assembled in a sequential order in the gel holder;
 b. a protein blotting chamber;
 c. a liquid transfer buffer handling system; and
 d. a control panel and power supply.

15. The wet protein blotting system of claim 14, wherein the gel holder comprises a first frame structure comprising a cathode and a second frame structure comprising an anode, wherein the first frame structure and the second frame structure are connected by a hinge.

\* \* \* \* \*